US011290886B2

(12) United States Patent
Stengel et al.

(10) Patent No.: US 11,290,886 B2
(45) Date of Patent: Mar. 29, 2022

(54) AUTHENTICATING A MOBILE ID VIA HASH VALUES

(71) Applicant: Deutsche Telekom AG, Bonn (DE)

(72) Inventors: Christian Stengel, Rosbach (DE);
Joerg Breuer, Kreuztal (DE);
Friedrich Toensing, Hoechst (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/121,876

(22) Filed: Dec. 15, 2020

(65) Prior Publication Data
US 2021/0195419 A1 Jun. 24, 2021

(30) Foreign Application Priority Data

Dec. 19, 2019 (EP) ..................... 19218178

(51) Int. Cl.
| G06F 21/62 | (2013.01) |
| H04W 12/069 | (2021.01) |
| H04W 12/033 | (2021.01) |
| H04L 9/06 | (2006.01) |
| H04W 12/02 | (2009.01) |
| H04W 12/08 | (2021.01) |

(52) U.S. Cl.
CPC ...... *H04W 12/069* (2021.01); *G06F 21/6254* (2013.01); *H04L 9/0643* (2013.01); *H04W 12/02* (2013.01); *H04W 12/033* (2021.01); *H04W 12/08* (2013.01)

(58) Field of Classification Search
CPC . H04W 12/069; H04W 12/02; H04W 12/033; H04W 12/08; H04W 12/06; G06F 21/6254; H04L 9/0643; H04L 63/0421
See application file for complete search history.

(56) References Cited

U.S. PATENT DOCUMENTS

| 10,594,484 B2 * | 3/2020 | Rodriguez ............ H04L 9/0822 |
| 2017/0339138 A1 | 11/2017 | Lewison et al. |
| 2018/0367305 A1 | 12/2018 | Gouget et al. |
| 2020/0118124 A1 * | 4/2020 | Menon ................. G06Q 20/409 |

FOREIGN PATENT DOCUMENTS

| DE | 102015207064 A1 | 10/2016 |
| DE | 102015214340 A1 | 2/2017 |
| DE | 102015209073 B4 | 2/2019 |
| WO | WO 0143344 A1 | 6/2001 |

* cited by examiner

*Primary Examiner* — Izunna Okeke
(74) *Attorney, Agent, or Firm* — Leydig, Voit & Mayer, Ltd.

(57) ABSTRACT

A method for authenticating a mobile identity (ID) is provided. The mobile ID is provided on an end device of a user. Personal information about the user is first brought into anonymized form via a one-way function known to the end device of the user and to a first entity and transmitted with a single mobile ID certificate to the first entity. A communication exchange between the end device of the user and the first entity is henceforth identified by this mobile ID certificate. At a later point in time, the user is provided a permission option to transmit the personal information in non-anonymized form to the first entity. The first entity uses the then transmitted non-anonymized personal information to check its anonymized form.

12 Claims, 1 Drawing Sheet

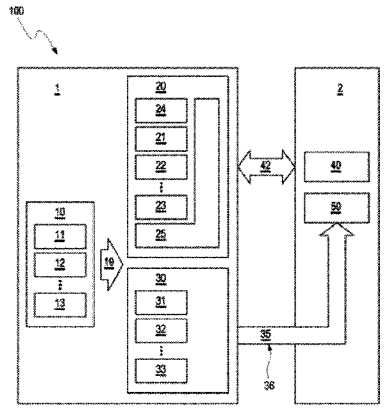

| 100 | Mobile ID with a certificate | 22 | Hash(mask(data$_2$)) | 36 | After user consent |
| 1 | End device of the user | 23 | Hash(mask(data$_N$)) | | with released values |
| 2 | First (external) entity | 24 | Public certificate data | 40 | Certificate check |
| 10 | Physical ID | 25 | Signature | 42 | Authentication/ |
| 11 | Data$_1$ | 30 | Mobile ID identification | | communication channel |
| 12 | Data$_2$ | | data | 50 | Masking and hash |
| 13 | Data$_M$ | 31 | Data$_1$ including masking | | value check via individual |
| 19 | Derivative | 32 | Data$_2$ including masking | | hash values |
| 20 | Mobile ID certificate | 33 | Data$_N$ including masking | | |
| 21 | Hash(mask(data$_1$)) | 35 | Identification | | |

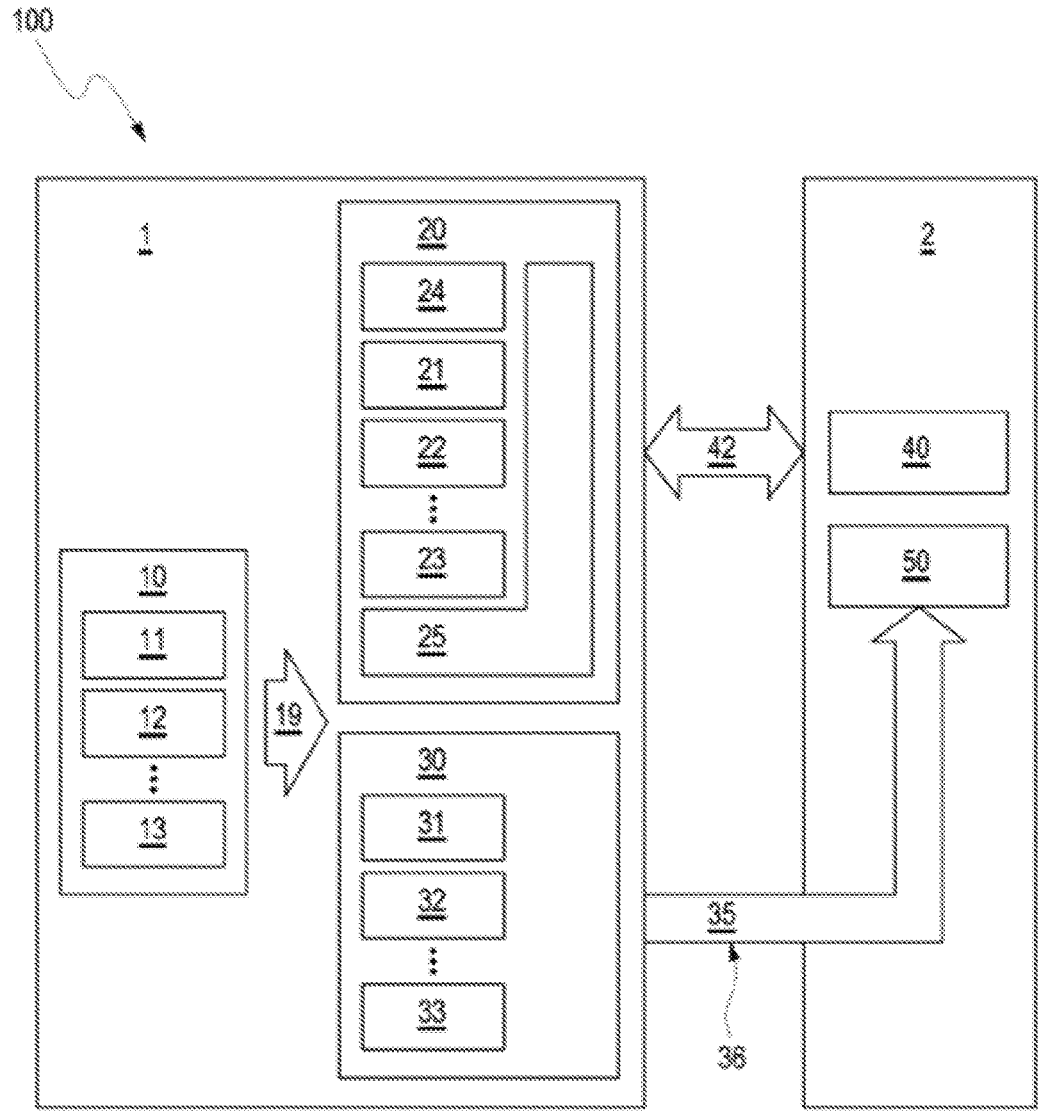

Fig. 1

| | | | | | |
|---|---|---|---|---|---|
| 100 | Mobile ID with a certificate | 22 | Hash(mask(data$_2$)) | 36 | After user consent with released values |
| 1 | End device of the user | 23 | Hash(mask(data$_N$)) | | |
| 2 | First (external) entity | 24 | Public certificate data | 40 | Certificate check |
| 10 | Physical ID | 25 | Signature | 42 | Authentication/ communication channel |
| 11 | Data$_1$ | 30 | Mobile ID identification data | | |
| 12 | Data$_2$ | | | 50 | Masking and hash value check via individual hash values |
| 13 | Data$_M$ | 31 | Data$_1$ including masking | | |
| 19 | Derivative | 32 | Data$_2$ including masking | | |
| 20 | Mobile ID certificate | 33 | Data$_N$ including masking | | |
| 21 | Hash(mask(data$_1$)) | 35 | Identification | | |

AUTHENTICATING A MOBILE ID VIA HASH VALUES

CROSS-REFERENCE TO PRIOR APPLICATIONS

Priority is claimed to European Patent Application No. EP 19218178.2, filed on Dec. 19, 2019, the entire disclosure of which is hereby incorporated by reference herein.

FIELD

The present invention relates to a method for authenticating a mobile identity (ID) via hash values.

BACKGROUND

The number of available online services, such as streaming, online shopping, social media, e-mail, online banking, etc. and the number of service providers providing these services is huge. In contrast, the number of devices with which access to these services is realized is not infrequently only a smartphone of a user. In order to participate in the systems, electronic identities (eIDs) in a mobile version as mobile IDs are required on this smartphone in order to gain access to online services. These electronic identities are a prerequisite for participation in digital service worlds since a user can use such a mobile ID to authenticate and identify themselves to any external entity, such as a website or an app.

However, conventional identification solutions that are established as safe have crucial disadvantages. Either they require a very complex implementation, such as the so-called Extended Access Control (EAC) as stated in a technical guideline of the Federal Office for Security in the Information Technology (BSI) with the designation BSI-TR03110, or they fail because of the necessity of keeping personal data secret at the high hurdles of the GDPR (short for General Data Protection Regulation: GDPR (EU) 2016/679 OF THE EUROPEAN PARLIAMENT AND COUNCIL dated Apr. 27, 2016, on protecting natural persons during the processing of personal data, on the free movement of data and on repealing Directive 95/46/EG). Thus, an identification certificate always includes personal data, such as the name or address of the user, which can be viewed by all entities that have access to that certificate.

A method for generating a certificate is disclosed, for example, in document DE 10 2015 207 064 A1, wherein the certificate is derived from a further certificate from a public key infrastructure for documents.

Document DE 10 2015 209 073 B4 describes an improved method for reading attributes from an ID token. A corresponding ID token and a computer system are also provided.

Document DE 10 2015 214 340 A1 describes a method for checking the validity of a certificate generated by an ID token of a user for a security token of the same user. Furthermore, the certificate for a security token of a user may be generated by an ID token of the same user.

The technical guideline BSI TR-03110 "Advanced Security Mechanisms for Machine Readable Travel Documents and eIDAS Token" specifies in its first part in version 2.20 dated Feb. 26, 2015, the security mechanisms for machine-readable travel documents and eIDAS tokens. The specification forms in particular the basis for the security mechanisms of the German identification card and the residence permit, as well as European passports and driver licenses. In the second part in version 2.21 dated Dec. 21, 2016, protocols for electronic identification, authentication and trust services (eIDAS) are specified.

SUMMARY

In an exemplary embodiment, the present invention provides a method for authenticating a mobile identity (ID) provided on an end device of a user. The method includes: providing, by the end device, personal information about an identity of the user as a plurality of attributes; anonymizing, by the end device, the personal information, wherein anonymizing the personal information comprises: calculating first one-way values via a one-way function via a selection of respective attributes, uniquely identifying the user, from the plurality of attributes; forming, by the end device, a unique serial number; forming, by the end device, a mobile ID certificate having the unique serial number and at least one anonymized information field in which the first one-way values are stored; transmitting, by the end device, the mobile ID certificate from the end device of the user to a first entity; establishing a secure communication channel between the end device and the first entity and/or authenticating, by the first entity, communication data from the end device based on the transmitted mobile ID certificate; requesting, by the end device, permission of the user via an output unit of the end device to transmit personal information to the first entity; receiving, by the end device, permission from the user via an input unit of the end device; transmitting, by the end device, personal information in non-anonymized form to the first entity; and identifying, by the first entity, the user via second one-way values subsequently calculated using the one-way function and compared to the first one-way values.

BRIEF DESCRIPTION OF THE DRAWINGS

Embodiments of the present invention will be described in even greater detail below based on the exemplary FIGURES. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 1 shows a block diagram for a possible use of a method according to an exemplary embodiment.

DETAILED DESCRIPTION

Exemplary embodiments of the present invention provide a method for authenticating a mobile identity, in which the identity of a user can be authenticated via a single certificate. A key for this purpose may be realizable in conformity with the GDPR.

In the following, some terms relevant to the disclosure content of the present application are defined firstly.

Entity: Uniquely identifiable information object which can request and/or process and/or forward data.

One-way value, e.g., hash value: Via a one-way function, e.g., a hash function, a large input quantity is mapped to a smaller target quantity, the so-called one-way values (hash values in the hash function). The one-way function is chosen in the context of the invention as non-injective and exclusively performs non-injective mappings. The input quantity may include elements of different lengths (e.g., characters), whereas the target quantity always has an equally fixed length (e.g., numbers).

Identity (ID): Collection of personal attributes which uniquely identify a person/user.

ID broker: Maps ID attributes to a digital subject via multiple ID providers.

ID provider (IDP): Authenticates an ID.

Mobile ID: Identity which allows identification of the user in mobile operation.

Mobile ID certificate: Certificate of anonymized personal information, which is taken from, for example, attributes from an identification card or a driver license or a health insurance card.

X.509: Is an ITU-T standard for a public key infrastructure for creating digital certificates.

In an exemplary embodiment, a method for authenticating a mobile ID is provided, in which the mobile ID is provided on an end device of a user. First, personal information about the user is brought into an anonymized form via a one-way function known to the end device of the user and to a first entity and transmitted with a single mobile ID certificate from the end device of the user to the first entity. From now on, this mobile ID certificate is used to identify a communication exchange between the end device of the user and the first entity. At a later point in time, the user is provided with an option of permission to transmit the personal information in non-anonymized form to the first entity from the end device of the user, and on the basis of the non-anonymized personal information then transmitted from the end device of the user, the first entity carries out a check of its anonymized form. The following steps are carried out:

- providing a plurality of personal information about an identity of the user as a plurality of attributes. This, for example, can be done by the user during start-up and/or initialization of the end device of the user.
- calculating first one-way values via the one-way function on the end device via a selection of respective attributes that uniquely identifies the user, from the plurality of attributes. The selection of respective attributes that uniquely identifies the user is predetermined, for example, by name, telephone number and address;
- forming a unique feature, e.g., serial number, by the end device;
- forming the mobile ID certificate having the unique serial number and at least one anonymized information field (AIF) in which the first one-way values are stored;
- transmitting the mobile ID certificate from the end device of the user to the first entity;
- establishing a secure communication channel between the end device of the user and the first entity and/or authenticating communication data with the end device of the user by the first entity via the transmitted mobile ID certificate;
- requesting permission of the user on an output unit of the end device to transmit personal information in non-anonymized form from the end device of the user to the first entity;
- permitting by the user on an input unit of the end device and transmitting personal information, in a non-anonymized form, from the end device of the user to the first entity;
- identifying the user by the first entity via second one-way values subsequently calculated with the one-way function and their comparison with the first one-way values.

The method according to an exemplary embodiment of the invention thus provides a mobile identity which can be realized in a simple and GDPR-compliant manner via a single certificate for authentication or for identification and optionally for provision of associated keys. The user executing the method on their end device can therefore advantageously authenticate and identify themselves with respect to any first entity or external first entity, such as a website or an app, without first transmitting the identity of the user itself or further data relating to the identity of the user, but only anonymized data in the form of one-way values.

The mobile ID certificate forms signed information. If the communication exchange is performed via a mobile ID certificate formed according to the ITU-T standard, for example an X.509 certificate, the unique serial number is, for example, stored in "SubjectDN", wherein the one-way values are entered, for example, in "SubjectAlternativeNames."

The method according to an exemplary embodiment of the invention is based on embedding all relevant and personal identification data as well as additional information associated with the person (e.g., authorization for a system) as one-way values in an anonymized manner into an authentication certificate, namely into the mobile ID certificate for authentication between the user and the first entity. Real data can then subsequently be passed to the external first entity by the user and be checked there if necessary and after previous consent. First, however, the mobile ID certificate can be used for anonymous authentication without having to transmit GDPR-relevant information to the first entity in this authentication.

Moreover, the method according to an exemplary embodiment of the invention provides the following features and advantages:

- Simplicity. This means that the mobile ID may be easily implemented and easily integrated into existing systems. The mobile ID may also be easily adaptable to existing systems. This advantage also applies in particular with respect to websites and entities which require identification and reach a higher security level with the mobile ID than without the mobile ID.
- Universality and modularity. This means that the mobile ID may be universal and usable in various scenarios and is supported by worldwide equipment and browser standards. The mobile ID may be executable on existing systems at least to a limited extent, wherein further functions and a mobile ID subsystem may be able to be supplemented successively in a modular manner.
- Promise of benefit. This means that the mobile ID may be set up in a simple manner and may be convenient and comfortable to use. In addition, it may be easily capable of being integrated into a new ID broker system and into a smartphone app in order to enable a sufficiently extensive usage experience in the sense of "one-stop shopping." Use may be comparable to or simpler than a user name/password combination.
- Multi-ID capability. This means that a system on which the mobile ID is implemented may be capable of multiple IDs and thus may enable a derivation of different identities from different sources. Depending on the source, a confidence level may be assignable to the mobile ID.
- Conformity with regulations. This means that a further system on which the mobile ID is implemented may be qualified or notified based on the eIDAS guideline. In addition, it may be possible to include the system as a special case using an identification card for providing the personal information in the existing eID security framework according to BSI TR-03159 "Mobile Identities."

Hardware security. This means that yet another system on which the mobile ID is implemented may support a hardware approach for secure identification and authentication.

It may be possible to implement the use of two or more certificates, of which a first authentication certificate is anonymous and can be used for authentication with respect to a respective external entity and for establishing a secure channel, while further identification certificates can contain various information about the user or, for example, information associated with the user. However, in order to be able to satisfy the GDPR, the further identification certificates must not be used for authentication since there is no secure channel for transmitting personal data prior to authentication. In addition, they must only be forwarded to the respective external entity if the user has previously explicitly consented to the use of personal data and if these data can be transported via a secure channel. This circumstance leads to great complexity of this approach with two or more certificates since under certain circumstances, a larger number of certificates is needed and each ID provider must transfer the correct identification certificate to a respective external entity.

In order to verify authenticity of data in electronic identifications or non-manipulation of identifications, the technical guideline BSI TR03110-1 is indeed known as a method for passive authentication. In this case, one-way values of all data stored in the identification are individually signed in the form of hash values during the creation of the identification so that an external entity can check the authenticity of the data individually and according to the right to access. However, this method for passive authentication, which is technically based on a check of hash values, consists in the individual integrity check of existing real data and not in the anonymized transfer of data in a single certificate according to the invention within the framework of dynamic authentication, which advantageously comprises a subsequent check of personal real data. An identification solution known, for example, from BSI TR03110-1 therefore has crucial disadvantages and the identification solution described in the preceding paragraph via two or more certificates also firstly requires the generation and provision of the required certificates, in which the identification certificate must only be forwarded to the external entity after explicit consent of the user. On the one hand, this leads to an increased outlay in the construction of a public key infrastructure (mostly abbreviated as PKI). On the other hand, according to such a multiple-certificate model, the user can securely provide either no or only the identification data that are in the respective certificate.

In one embodiment of the method according to the invention, the first entity is formed by an online service.

In a continued embodiment of the method according to the invention, the online service is selected at least from the following list: e-mail, online shopping, social media, online banking, Internet of Things (IoT), car connectivity, e-ticketing.

In another embodiment of the method according to the invention, the end device is selected at least from the following list: smartphone, smartwatch, notebook, laptop, tablet, navigation device, Global Positioning System (GPS) tracker, IoT device.

In another embodiment of the method according to the invention, the one-way function is formed by a hash function and the one-way values are formed by hash values.

In yet another embodiment of the method according to the invention, at least some of the personal information is extracted from an identification document, wherein the identification document is selected at least from the following list: identification card, passport, driver license, health insurance card, corporate identification card, signature card, digital vehicle key, e-ticketing user medium, identity provider (such as Verimi), user account of an online system.

In a continued further embodiment of the method according to the invention, at least some of the personal information is formed on an output unit of the end device due to information provided by the user via an input unit of the end device in response to predetermined questions of the first entity, in particular of a respective online service, wherein the attributes can be selected at least from the following list: telephone number, telephone number as a child, street name of the parental home, maiden name of the mother.

In a continued yet further embodiment of the method according to the invention, the personal information is formed at least by attributes from the following list: complete name, birth name, date of birth or birthday, physical private address, physical professional address, e-mail address.

In another embodiment of the method according to the invention, the respective one-way values are masked with a masking function, wherein a function data set specifying the masking function is stored in the mobile ID certificate. As a result, so-called codebook attacks are advantageously prevented since a respective first entity or external first entity providing the online service can calculate and check the one-way values only via this function data set and the masking data transferred with the personal data; guessing of the personal data and creation of a codebook concerning this matter are thereby prevented. If further data are required by the external entity following the authentication, they can subsequently be passed together with the masking data to the external first entity in a manner protected from unauthorized eyes via the secure channel established within the framework of the authentication. The external first entity can then check the data by subsequent calculation and comparison of the respective one-way values.

In yet another embodiment of the method according to the invention, in addition to the serial number and the at least one AIF, a Uniform Resource Locator (URL) is stored in the mobile ID certificate, wherein the URL refers to a data account associated with the user on an external second entity or a second entity. The user has previously added third one-way values via an external data set stored there to the at least one used AIF of the mobile ID certificate. Fourth one-way values are formed by the first entity via the external data set stored under the URL and compared with the third one-way values of the mobile ID certificate.

In another continued embodiment of the method according to the invention, the second entity is formed by an external data server or database server, i.e., a server not locally connected to the end device.

In yet another continued embodiment of the method according to the invention, the communication exchange with the mobile ID certificate is encrypted.

Exemplary embodiments of the invention also provide a system for authenticating a mobile ID, comprising at least one end device of a user, a first entity, an output unit comprised by the end device, and an input unit comprised by the end device. The system is configured to provide the mobile ID on the end device of the user, to first bring personal information about a user into an anonymized form via a one-way function known to the end device of the user and to the first entity, to transmit it with a single mobile ID certificate from the end device of the user to the first entity, to henceforth identify a communication exchange with the first entity with this mobile ID certificate, to, at a later point in time, provide a permission option to the user to transmit the personal information in non-anonymized form to the first entity, and to check its anonymized form by the first entity on the basis of the non-anonymized personal information then transmitted thereto, and in so doing to perform the following steps:

providing a plurality of personal information about an identity of the user as a plurality of attributes;
   calculating first one-way values via the one-way function via a selection of respective attributes, uniquely identifying the user, from the plurality of attributes;
   forming a unique serial number by the end device;
   forming the mobile ID certificate having the unique serial number and at least one AIF in which the first one-way values are stored;
   transmitting the mobile ID certificate from the end device to the first entity;
   establishing a secure communication channel between the end device of the user and the first entity and/or authenticating communication data with the end device of the user by the first entity via the transmitted mobile ID certificate;
   requesting permission of the user on an output unit of the end device to transmit personal information from the end device of the user to the first entity;
   permitting by the user on an input unit of the end device and transmitting personal information from the end device of the user to the first entity;
   identifying the user by the first entity via second one-way values subsequently calculated with the one-way function and their comparison with the first one-way values.

In one embodiment of the system according to the invention, the first entity of the system is configured to form an online service.

In a further embodiment of the system according to the invention, the one-way function is a hash function which is configured to form hash values as one-way values.

In an embodiment of the system according to the invention, the system additionally comprises a second entity and is configured to store a URL in the mobile ID certificate in addition to the serial number and the at least one AIF. The URL refers to a data account associated with the user on the second entity, and the user has previously added third one-way values via an external data set stored there to the at least one AIF of the mobile ID certificate. Via the first entity, which is formed, for example, by the online service, wherein the online service can comprise an authentication system, fourth one-way values are formed via the external data set stored under the URL and compared with the third one-way values of the mobile ID certificate.

The method described above and the system described above have some decisive advantages over previous authentication solutions:

The system provides the aforementioned features and advantages. In particular, it is also easily implemented with hardware support and integrated into existing structures.
   In particular, the system supports an ID broker system. The ID broker must herewith initiate the generation of a mobile ID once and can then, during an application or depending on the application case of an external first entity providing the online service, provide the ID data required for the online service in a checkable manner after consent of the user.
   The check of ID data is carried out via countercalculation and the comparison of a calculated second hash value with the entry of the first hash value in the mobile ID certificate. Since the first hash value is part of the mobile ID certificate, it is possible for the external first entity to check both the integrity and the authenticity of the transmitted data via already existing anonymized data from the mobile ID certificate. This allows simple identification without greater overhead.
   Hash values have the decisive advantage that they are one-way values which are calculated by one-way functions and from which the original data cannot be derived. Thereby it is possible to encode personal information according to a zero-knowledge approach in the mobile ID certificate without having to disclose these data.
   The user maintains data sovereignty over their data since they can decide, for each piece of data, whether it is to be forwarded to the external first entity or not. Conversely, the external first entity has, for all transferred data, the option of checking the authenticity and integrity and thereby of being able to uniquely identify the user.
   Even without later transfer of personal data, i.e., also in the case of completely anonymous use, the system allows, in the event of suspected misuse, depending on the implementation, a check of the personal data on the part of the provider of the online service.

During an authentication process, an authentication request for a specific application case or use case may be sent to the URL mentioned in the certificate. It is then checked in the account whether this authentication request can be processed, i.e., whether, for example, the data necessary for the use case is stored in the account. In the positive case, the system then sends a release request to the registered user, e.g., by a push message. When the user releases the data, the authentication system receives the data relevant to the use case from the account and compares their third one-way values, which can be formed, for example, by only one hash value but also by a plurality of hash values, according to the invention with the first one-way values, which can be formed, for example, by only one hash value but also by a plurality of hash values, in the certificate. In this way, a very flexible authentication system is advantageously implemented, which can be supplemented gradually with further use cases or authentication processes. Data protection in the system according to the invention is ensured in that the user themselves releases the data for the requested use case. The user can then later, if applicable, receive different certificates for respective use cases, or a plurality of use cases can, if applicable, be combined in one certificate.

Embodiments of the method according to the invention or embodiments of the system according to the invention for the mobile ID certificate described above are only examples of the transport of anonymized data in the mobile ID certificate and the later provision of the real data. Instead of the identity, any data can also be transported in the AIF. Another embodiment according to the invention is an access system in which at least one access one-way value for access authorizations is transferred in the at least one AIF. Thus, in later use, only the access system itself can check whether and where the owner of the mobile ID certificate gains access. In the case of access authorization, the access one-way values for this purpose are formed by data, such as
- access area;
- date/time from;
- date/time to,
- issued by;
- etc.

Further advantages and embodiments of the invention are given by the description and the accompanying drawing.

It is to be understood that the features mentioned above and the features to be explained in detail below can be used not only in the respective indicated combination but also in other combinations or alone without departing from the scope of the present invention.

FIG. 1 shows a flowchart 100 for a possible use of a method according to an exemplary embodiment of the invention on the basis of hash values as one-way values. A user of an end device 1 authenticates themselves through a physical ID 10, e.g., an identification card, which provides M attributes 11, 12, 13 with respect to personal information as $data_1$ 11, $data_2$ 12, up to $data_M$ 13. From these M attributes 11, 12, 13, N attributes that uniquely identify the user (for example predetermined as a first name, last name, birthday, and address) are selected 19, and via a hash function, hash values hash(mask($data_1$)) 21, hash(mask($data_2$)) 22 to hash (mask($data_N$)) 23 are derived via, if applicable, masked data and integrated into a mobile ID certificate 20, which additionally contains public certificate data 24 and a signature 25. Furthermore, mobile ID identification data 30 with $data_1$ including masking 31, $data_2$ including masking 32, up to $data_N$ including masking 33 are also formed. While an (external) first entity 2 performs authentication 42 of the communication exchange with the end device 1 of the user via the mobile ID certificate by a certificate check 40, identification 35 takes place only in the further course of the communication exchange after a dedicated user consent with released personal values 36. For this purpose, the external first entity 2 performs a hash value check 50 as a subsequent calculation of individual hash values, which may be masked, if applicable.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Mobile ID with a certificate
1 End device of the user
2 First (external) entity
1 Physical ID
11 $Data_1$
12 $Data_2$
13 $Data_M$
19 Derivative
20 Mobile ID certificate
21 Hash(mask($data_1$))
22 Hash(mask($data_2$))
23 Hash(mask($data_N$))
24 Public certificate data
25 Signature
30 Mobile ID identification data
31 $Data_1$ including masking
32 $Data_2$ including masking
33 $Data_N$ including masking
35 Identification
36 After user consent with released values
40 Certificate check
42 Authentication/communication channel
50 Masking and hash value check via individual hash values

The invention claimed is:

1. A method for authenticating a mobile identity (ID) provided on an end device of a user, comprising:
providing, by the end device, personal information about an identity of the user as a plurality of attributes;
anonymizing, by the end device, the personal information, wherein anonymizing the personal information comprises: calculating first one-way values via a one-way function via a selection of respective attributes, uniquely identifying the user, from the plurality of attributes;
forming, by the end device, a unique serial number;
forming, by the end device, a mobile ID certificate having the unique serial number and at least one anonymized information field in which the first one-way values are stored;
transmitting, by the end device, the mobile ID certificate from the end device of the user to a first entity;
establishing a secure communication channel between the end device and the first entity and/or authenticating, by the first entity, communication data from the end device based on the transmitted mobile ID certificate;
requesting, by the end device, permission of the user via an output unit of the end device to transmit personal information to the first entity;
receiving, by the end device, permission from the user via an input unit of the end device;
transmitting, by the end device, personal information in non-anonymized form to the first entity; and
identifying, by the first entity, the user via second one-way values subsequently calculated using the one-way function and compared to the first one-way values;
wherein in addition to the unique serial number and the at least one anonymized information field of the mobile ID certificate, a Uniform Resource Locator (URL) is stored, wherein the URL refers to a data account associated with the user on a second entity, wherein third one-way values were previously added to the at least one anonymized information field of the mobile ID certificate via an external data set stored there, and wherein fourth one-way values are formed by the first entity via the external data set stored under the URL and compared with the third one-way values of the mobile ID certificate.

2. The method according to claim 1, wherein the first entity corresponds to an online service.

3. The method according to claim 2, wherein the online service includes at least one of the following: e-mail, online shopping, social media, online banking, Internet of Things (IoT), car connectivity, or e-ticketing.

4. The method according to claim 1, wherein the end device is at least one of the following: smartphone, smartwatch, notebook, laptop, tablet, navigation device, Global Positioning System (GPS) tracker, or Internet of Things (IoT) device.

5. The method according to claim 1, wherein the one-way function is a hash function and the one-way values are hash values.

6. The method according to claim 1, wherein at least some of the personal information is obtained from an identification document or from an identity provider or an identity service, wherein the obtained information includes information from at least one of the following: identification card, passport, driver license, health insurance card, corporate identification card, signature card, digital vehicle key, e-ticketing user medium, identity provider, or user account of an online system.

7. The method according to claim 2, wherein at least some of the personal information is provided on the output unit of the end device based on information provided by the user via the input unit of the end device in response to predetermined questions of the online service, wherein the attributes include at least one of the following: telephone number, telephone number as a child, street name of the parents' home, or mother's maiden name.

8. The method according to claim 1, wherein the personal information includes at least one of the following: complete name, birth name, birth date or birthday, physical private address, physical professional address, e-mail address.

9. The method according to claim 1, wherein the one-way values are masked using a masking function, wherein a function data set specifying the masking function but not the data for masking is stored in the mobile ID certificate.

10. The method according to claim 1, wherein the second entity corresponds to an external data server or database server.

11. The method according to claim 1, wherein the communication exchange is encrypted using the mobile ID certificate.

12. A system for authenticating a mobile identity (ID), comprising:
an end device of a user, the end device comprising an output unit and an input unit;
a first entity; and
a second entity;
wherein the end device is configured to:
provide personal information about an identity of the user as a plurality of attributes;
anonymize personal information, wherein anonymizing the personal information comprises: calculating first one-way values via a one-way function via a selection of respective attributes, uniquely identifying the user, from the plurality of attributes;
form a unique serial number;
form a mobile ID certificate having the unique serial number and at least one anonymized information field in which the first one-way values are stored; and
transmit the mobile ID certificate from the end device of the user to the first entity;
wherein the end device and the first entity are configured to establish a secure communication channel between the end device and the first entity, and/or the first entity is configured to authenticate communication data from the end device based on the transmitted mobile ID certificate;
wherein the end device is further configured to:
request permission of the user via the output unit of the end device to transmit personal information to the first entity;
receive permission from the user via the input unit of the end device; and
transmit personal information in non-anonymized form to the first entity;
wherein the first entity is configured to identify the user via second one-way values subsequently calculated using the one-way function and compared to the first one-way values;
wherein the end device is further configured to store a Uniform Resource Locator (URL) in the mobile ID certificate in addition to the serial number and the at least one anonymized information field, wherein the URL refers to a data account associated with the user on the second entity and third one-way values were previously added via an external data set stored there to the at least one anonymized information field of the mobile ID certificate;
wherein the first entity is further configured to form fourth one-way values via the external data set stored under the URL and compare the fourth one-way values with the third one-way values of the mobile ID certificate.

* * * * *